United States Patent Office 2,807,556
Patented Sept. 24, 1957

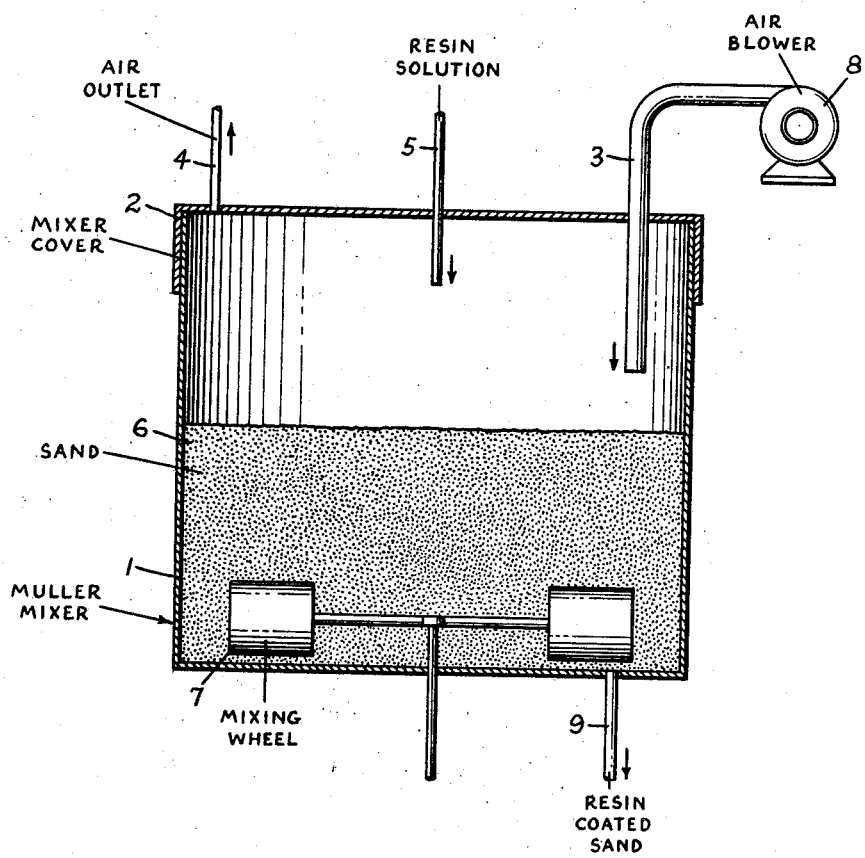

2,807,556

PROCESS FOR PRODUCING DRY, FREE-FLOWING, THERMOSETTING RESIN-COATED SAND GRANULES

John L. Stark, Teaneck, N. J., assignor to Allied Chemical & Dye Corporation, New York, N. Y., a corporation of New York Application August 3, 1954, Serial No. 447,621

8 Claims. (Cl. 117—100)

This invention relates to the preparation of coated investment material and more particularly refers to a new and improved process for the production of coated sand granules adapted for use in shell molding.

The conventional shell molding process for making foundry molds involves dumping a mixture of sand and a thermosetting resin onto a hot pattern with the resultant formation of a thin shell of sand bonded by the hot resin. The bonded shell is cured at high temperature and removed from the hot pattern and used as the mold in which metal castings are made. As an alternative to the dumping method just described, the sand-thermosetting resin mixture may be blown onto a hot pattern to produce a shell mold which is cured as described above. Since the sand-thermosetting resin composition is a physical mixture of materials of different sizes and specific gravities, it is difficult to prevent segregation under normal operating conditions. Consequently the product, namely the shell mold, does not have uniform strength characteristics, resulting in considerable spoilage. To make up for faulty resin distribution, more resin than is theoretically required for bonding must be incorporated with the sand to assure preparation of a strong mold. This increases cost, since the resin is the most expensive component of the composition.

An object of the present invention is to provide a method for producing resin-coated sand granules adapted for use in the shell molding process for the production of foundry molds and cores.

Another object of the present invention is to provide an efficient economical process for producing resin-coated sand granules wherein the desired flow property of the resin does not change during the coating process and the coated granules are not cohesive but are free-flowing.

Other objects and advantages will be apparent from the following description and accompanying drawing.

To avoid separation and stratification of a sand-resin mix, attempts were made to coat sand granules by mixing a solution of resin in solvent with sand and then heating the mixture to drive off the solvent. Many difficulties were encountered in this procedure. The addition of a resin solution to sand causes sand particles to stick together regardless of how long and intensively the mixing is carried out. Therefore, in order to relieve the mixture of some of its adhesive properties, heat was applied to drive off the solvent. However, it was found that even though mixing was continued during the application of heat the resultant product retained lumps and agglomerates and did not have the requisite free-flowing properties for shell molding but required further sieving and classification. More important, I have found that the application of heat changes the chemical and physical properties of the thermosetting resin in the mix resulting in sand granules coated with a resin having different properties from the original resin and also, since it is very difficult to control the time of heating and temperature resulting in a non-uniform product. Thermosetting resins incorporated with sand to bind the sand during the formation of shell molds are carefully prepared to have the requisite properties for that purpose, particularly the flow property which refers to the change in viscosity of the resin with time. Thus it will be evident that the application of heat to which these resins are sensitive results in a resin coated sand in which the resin has different properties than the original specially prepared resin and furthermore the batches of resin coated sand are not uniform due as a practical matter to the inability to maintain absolute constant conditions during the process of coating.

In accordance with the present invention free-flowing resin coated sand granules in which the resin properties are not altered during the coating process may be obtained by introducing sand at a temperature below 40° C., preferably at about atmospheric temperature into a mixer, adding a solution of a thermosetting resin dissolved in a solvent boiling at atmospheric pressure between about 40° C. and 115° C., preferably between 55° C. and 90° C., thoroughly mixing the sand and resin solution until the granules of sand are coated with resin solution, continuing the mixing, and while continuing the mixing introducing a gas at a temperature below about 40° C., preferably about atmospheric temperature, in contact with the sand-resin solution undergoing mixing until the solvent is removed by evaporation into the gas stream, continuing the mixing and introduction of gas until the resin coated sand granules are dry and free-flowing, and recovering the resin coated sand granules.

Mixing of the sand and resin solution to effect coating of the sand granules may be accomplished in any conventional apparatus suitable for effecting intimate contact between the resin solution and the sand. In the accompanying drawing is diagrammatically illustrated one well-known mixer known as the Muller mixer or pan mixer 1 and found in practice to be satisfactory for coating the sand granules. Fitted on top of Muller mixer 1 is mixer cover 2 provided with inlet 3 for the introduction of air and outlet 4 for the discharge of air. A convenient method for dumping sand in Muller mixer 1 is to first remove mixer cover 2; however, cover 2 need not be removed but may be provided with an opening for the introduction of sand. The use of hot sand should be avoided and only sand below temperature of about 40° C., preferably atmospheric temperature, should be placed in the Muller mixer. Resin solution is then added to the sand in mixer 1 through line 5. It is relatively unimportant whether the agitation of the sand is started and resin solution then added or whether the sand or resin are placed in the mixture and agitation of the mixture then started provided the solvent has a boiling point above the temperature of the sand but is sufficiently volatile to be removed by blowing air in contact with the sand. The resin is a synthetic thermosetting resin typified by a phenol-formaldehyde condensate but including also urea or melamine-formaldehyde resins or a polyester resin such as is commonly prepared by reacting polyhydric alcohols with polybasic acids. The phenolic resin may be either the "Novolak" type prepared using an acid catalyst or it may be the so-called "one-stage" type commonly prepared using a basic catalyst. The preferred resin and method of preparation is described in U. S. Patent 2,674,589 issued April 6, 1954.

A solution of the resin is prepared by dissolving the resin in a solvent, examples of which are methanol, ethanol, acetone, benzene and water. The solvent, dependent upon the resin used in the operation, should have a boiling point between 40° C. and 115° C. Due to heat being liberated during mixing the sand-resin mixture may rise 10–15° C. which may cause a too low boiling solvent to volatilize before the sand granules are completely coated. The use of a solvent having a boiling point above about 115° C. would not successfully accomplish evaporation of the solvent in the process of the present application and would require heating the sand mixture to too high a temperature resulting in agglomeration of the sand granules with alteration of the properties of the resin. Resin solution is intended to include a colloidal dispersion of a resin in a liquid medium and an emulsion of resin and water.

In an alternative method of operation powdered thermosetting resin may be added to the sand and thoroughly dispersed throughout the body of sand in Muller mixer 1 and then solvent such as methanol or ethanol added through line 5 to wet the resin, form a resin solution, and coat the sand granules.

The concentration of resin in the solution is not critical but may vary within wide limits. For example, approximately 50% by weight thermosetting phenol-formaldehyde resin and 50% by weight methanol may form a resin solution satisfactory for use in coating granules. The amount of thermosetting resin introduced in the sand mixture may vary from approximately ½% to about 5% by weight of the sand. Usually less resin is required than would be employed when preparing conventional physical mixtures of sand and resin. As is common in the preparation of investment material for the production of said molds, additives, for example wax or hexamethylenetetramine, may be introduced into the mixture of sand and resin.

After the addition of resin solution through line 5 to the body of sand 6 in Muller mixer 1 the mixture is agitated by rotation of the mixing mechanism diagrammatically illustrated in the drawing as mixing wheels 7 until resin solution and sand are thoroughly mixed which usually does not take more than about 5 to 10 minutes. Mixing is continued and air is blown by means of air blower 8 through line 3 directly onto the surface of the sand body 6, which because of continued agitation constantly exposes fresh surfaces of sand to the action of air sweeping across the surface. The air should be at a low temperature, that is, below 40–50° C., preferably about atmospheric temperature because high temperatures will alter the physical properties of the thermosetting resin which is sensitive to heat even for relatively short periods of time. Of course nitrogen or other gas may be employed in lieu of air. Although it was found convenient to introduce the air directly onto the surface of the body of sand 6, the air may also be introduced directly into the body of sand 6. The blowing of air in contact with the sand particles serves the function of evaporating the solvent and drying the sand and also effects removal of frictional heat from the sand by the cooling effect of evaporation of the solvent. During the process of blowing it is important that the resin be maintained in a free flowing condition by being constantly mixed. Air blowing for removal of solvent requires a surprisingly short time. Ordinarily ten minutes is adequate. Thus the operation involving mixing of the sand-resin solution and drying of coated sand by evaporation of solvent by an air stream is accomplished in the "cold," i. e. at a temperature below about 50° C. thereby avoiding change in physical and chemical properties of the resin and producing resin coated sand granules which are dry and free-flowing. Air carrying solvent vapor discharging through line 4 may be sent to an absorption system for recovery of the solvent or may be discharged to the atmosphere. The dry, free-flowing, resin coated sand discharges from the bottom of Muller mixer 1 through line 9.

The following examples illustrate the present invention.

*Example 1*

To a batch of sand at room temperature in a Muller mixer as illustrated in the drawing is added a methanol solution containing 50% by weight phenol-formaldehyde Novolak resin in an amount of 4.0% resin (8.0% of solution) by weight of the sand. The mixture is agitated for about 7 minutes until the resin solution and sand are thoroughly mixed. Air at about room temperature is blown over the surface of the sand-resin mixture and the mixing continued until, about 10 minutes, the sand is free floating. The methanol solvent is removed by evaporation into the air stream and discharged from the top of the mixer. The resultant sand granules are dry and free flowing having uniform coating of resin which will not separate from the sand and the resin remains unaltered in its properties during the coating process.

*Example 2*

To a batch of sand in a Muller mixer as in Example 1 is added 3.0% solid phenol-formaldehyde resin by weight of the sand and 10.0% hexamethylenetetramine based on weight of resin coarsely ground to approximately 20–100 mesh. The resin and hexamethylenetetramine are dry blended in the Muller mixer until thoroughly dispersed throughout the body of the sand. An amount of methanol equal in weight to the weight of the resin is added to the mixture and the mixing continued until essentially all the resin is in methanol solution (approximately 5 minutes). Air at about room temperature is blown onto the surface of the sand and mixing continued for approximately 10 minutes. The resulting resin-sand mix is free flowing and uniformly coated with resin.

Although certain preferred embodiments of the invention have been disclosed for purpose of illustration it will be evident that various changes and modifications may be made therein without departing from the scope and spirit of the invention.

I claim:

1. A process for the production of dry, free-flowing thermosetting resin coated sand granules adapted for use in a shell molding process for the production of foundry molds and cores which comprises intimately mixing at a temperature below about 50° C. a mechanically agitated contiguously constituted bed of particulate sand granules and a thermosetting resin dissolved in a liquid solvent having a boiling point above the temperature of said sand and within the range of 40–115° C. until the granules of sand are coated with the thermosetting resin solution, continuing the mixing, and while continuing the mixing passing a stream of gas at a temperature below about 40° C. in contact with the mechanically agitated contiguously consituted bed of particulate sand-thermosetting resin solution undergoing mixing until the liquid solvent is removed by evaporation into the gas stream, continuing the mixing and passage of gas in contact with the mixture until the thermosetting resin coated sand granules are dry and free-flowing, and recovering the dry, free-flowing thermosetting resin coated sand granules.

2. A process for the production of dry, free-flowing thermosetting resin coated sand granules adapted for use in a shell molding process for the production of foundry molds and cores which comprises intimately mixing at a temperature below about 50° C. a mechanically agitated continguously constituted bed of particulate sand granules and a finely divided solid thermosetting resin until the resin is uniformly dispersed throughout the body of sand, adding a liquid solvent having a boiling point above the temperature of said sand and between about 40–115° C. to the mixture of sand and thermosetting resin and continuing the mixing until the granules of sand are coated with resin solution, continuing the mixing, and while continuing the mixing passing a stream of gas at a temperature below about 40° C. in contact with the mechanically agitated contiguously constituted bed of particulate sand-thermosetting resin solution undergoing mixing until the liquid solvent is removed by evaporation into the gas stream, continuing the mixing and passage of gas in contact with the mixture until the thermosetting resin coated sand granules are dry and free-flowing, and recovering the dry, free-flowing thermosetting resin coated sand granules.

3. A process for the production of dry, free-flowing thermosetting resin coated sand granules adapted for use in a shell molding process for the production of foundry molds and cores which comprises intimately mixing at a temperature below about 50° C. a mechanically agitated contiguously constituted bed of particulate sand granules and a thermosetting resin dissolved in an organic liquid solvent having a boiling point within the range of 55–90° C. until the granules of sand are coated with the thermosetting resin solution, continuing the mixing, and while continuing the mixing passing air at a temperature below about 40° C. in contact with the mechanically agitated contiguously constituted bed of particulate sand-thermosetting resin solution undergoing mixing until the organic liquid solvent is removed by evaporation into the air stream, continuing the mixing and passage of air in contact with the mixture until the thermosetting resin coated sand granules are dry and free-flowing, and recovering the dry, free-flowing thermosetting resin coated sand granules.

4. A process for the production of dry, free-flowing thermosetting resin coated sand granules adapted for use in a shell molding process for the production of foundry molds and cores which comprises intimately mixing at a temperature below about 50° C. a mechanically agitated contiguously constituted bed of particulate sand granules and a finely divided solid thermosetting resin until the resin is uniformly dispersed throughout the body of sand, adding an organic liquid solvent having a boiling point between about 55–90° C. to the mixture of sand and thermosetting resin and continuing the mixing until the granules of sand are coated with resin solution, continuing the mixing, and while continuing the mixing passing air at a temperature below about 40° C. in contact with the mechanically agitated contiguously constituted bed of particulate sand-thermosetting resin solution undergoing mixing until the organic liquid solvent is removed by evaporaion into the air stream, continuing the mixing and passage of air in contact with the mixture until the thermosetting resin coated sand granules are dry and free-flowing, and recovering the dry, free-flowing thermosetting resin coated sand granules.

5. A process for the production of dry, free-flowing thermosetting resin coated sand granules adapted for use in a shell molding process for the production of foundry molds and cores which comprises intimately mixing at about atmospheric temperature a mechanically agitated contiguously constituted bed of particulate sand granules and a phenolformaldehyde thermosetting resin dissolved in a liquid organic solvent having a boiling point between about 55–90° C. until the granules of sand are coated with the thermosetting resin solution, continuing the mixing, and while continuing the mixing introducing air at about atmospheric temperature in contact with the mechanically agitated contiguously constituted bed of particulate sand-phenol-formaldehyde resin solution undergoing mixing until the liquid organic solvent is removed by evaporation into the air stream, continuing the mixing and passage of air in contact with the mixture until the phenol-formaldehyde thermosetting resin coated sand granules are dry and free-flowing and recovering the dry, free-flowing phenol-formaldehyde thermosetting resin coated sand granules.

6. A process for the production of dry, free-flowing thermosetting resin coated sand granules adapted for use in a shell molding process for the production of foundry molds and cores which comprises intimately mixing at about atmospheric temperature a mechanically agitated contiguously constituted bed of particulate sand granules and a finely divided solid phenol-formaldehyde thermosetting resin until the resin is uniformly dispersed throughout the body of sand, adding a liquid organic solvent having a boiling point between about 55–90° C. to the mixture of sand and phenol-formaldehyde thermosetting resin and continuing the mixing until the granules of sand are coated with resin solution, continuing the mixing, and while continuing the mixing introducing air at about atmospheric temperature in contact with the mechanically agitated contiguously constituted bed of particulate sand-phenol-formaldehyde resin solution undergoing mixing until the liquid organic solvent is removed by evaporation into the air stream, continuing the mixing and passage of air in contact with the mixture until the phenol-formaldehyde thermosetting resin coated sand granules are dry and free-flowing and recovering the dry, free-flowing phenol-formaldehyde thermosetting resin coated sand granules.

7. A process for the production of dry, free-flowing thermosetting resin coated sand granules adapted for use in a shell molding process for the production of foundry molds and cores which comprises intimately mixing at about atmospheric temperature a mechanically agitated contiguously constituted bed of particulate sand granules and a phenol-formaldehyde thermosetting resin dissolved in methanol until the granules of sand are coated with the phenol-formaldehyde resin solution, continuing the mixing, and while continuing the mixing introducing air at about atmospheric temperature in contact with the mechanically agitated contiguously constituted bed of particulate sand-phenol-formaldehyde resin solution undergoing mixing until the methanol is removed by evaporation into the air stream, continuing the mixing and passage of air in contact with the mixture until the phenol-formaldehyde thermosetting resin coated sand granules are dry said free-flowing and recovering the dry, free-flowing phenol-formaldehyde thermosetting resin coated sand granules.

8. A process for the production of dry, free-flowing thermosetting resin coated sand granules adapted for use in a shell molding process for the production of foundry molds and cores which comprises intimately mixing at about atmospheric temperature a mechanically agitated contiguously constituted bed of particulate sand granules and a finely divided solid phenol-formaldehyde thermosetting resin until the resin is uniformly dispersed throughout the body of sand, adding methanol to the mixture of sand and solid phenol-formaldehyde thermosetting resin and continuing the mixing until the granules of sand are coated with the phenol-formaldehyde resin solution, continuing the mixing, and while continuing the mixing introducing air at about atmospheric temperature in contact with the mechanically agitated contiguously constituted bed of particulate sand-phenol-formaldehyde resin solution undergoing mixing until the methanol is removed by evaporation into the air stream, continuing the mixing and passage of air in contact with the mixture until the phenol-formaldehyde thermosetting resin coated sand granules are dry and free-flowing and recovering the dry, free-flowing phenol-formaldehyde thermosetting resin coated sand granules.

References Cited in the file of this patent

UNITED STATES PATENTS

| | | |
|---|---|---|
| 1,631,113 | Anderson | June 7, 1927 |
| 1,650,133 | Keay | Nov. 22, 1927 |
| 1,901,325 | Novotny | Mar. 14, 1933 |
| 1,950,641 | Upper | Mar. 13, 1934 |
| 2,092,903 | Benner et al. | Sept. 14, 1937 |
| 2,114,229 | Martin et al. | Apr. 12, 1938 |
| 2,201,321 | Robie | May 21, 1940 |
| 2,582,701 | Iknayan | Jan. 15, 1952 |
| 2,706,188 | Fitko et al. | Apr. 12, 1955 |
| 2,708,622 | Stone | May 17, 1955 |